United States Patent [19]

Hyodo et al.

[11] Patent Number: 4,972,734
[45] Date of Patent: Nov. 27, 1990

[54] TORQUE VARIATION ABSORBING DEVICE

[75] Inventors: Motoi Hyodo, Toyota; Masakazu Kamiya, Toyoake, both of Japan

[73] Assignee: Aisin Seiki Kabushiki Kaisha, Kariya, Japan

[21] Appl. No.: 325,770

[22] Filed: Mar. 20, 1989

[30] Foreign Application Priority Data

Mar. 21, 1988 [JP]  Japan .............................. 63-036526[U]

[51] Int. Cl.$^5$ ........................ F16Z 15/10; F16D 3/14
[52] U.S. Cl. .................................. 74/574; 192/106.1; 192/107 M; 192/98; 192/70.17
[58] Field of Search .......... 74/574; 192/107 M, 106.1, 192/98, 70.17

[56] References Cited

U.S. PATENT DOCUMENTS

| | | | |
|---|---|---|---|
| 4,228,881 | 10/1980 | Nakamura | 192/98 |
| 4,663,983 | 5/1987 | Kobayashi et al. | 74/574 |
| 4,693,354 | 9/1987 | Umeyama et al. | 192/106.1 |
| 4,694,937 | 9/1987 | Jones | 192/107 M |
| 4,762,216 | 8/1988 | Pusatoiglu et al. | 192/107 M |
| 4,767,380 | 8/1988 | Chasseguet et al. | 74/574 |
| 4,846,323 | 7/1989 | Fukushima | 74/574 |
| 4,850,932 | 7/1989 | Kagiyama et al. | 74/574 |
| 4,857,032 | 8/1989 | Aiki et al. | 74/574 |

*Primary Examiner*—Leslie A. Braun
*Assistant Examiner*—Winnie Vlo
*Attorney, Agent, or Firm*—Burns, Doane, Swecker & Mathis

[57] ABSTRACT

A torque variation absorbing device includes a driving plate coupled to a driving shaft, a flywheel including a flywheel body and a driven plate arranged coaxially with the driving plate to be rotatably supported thereon and a spring mechanism. A damping and torque limiting mechanism and a hysteresis mechanism are interposed between the driving plate and the flywheel. The hysteresis mechanism includes a hysteresis plate which is fixed in the circumferential direction, a rubber member and a lining interposed between a distal end of the hysteresis plate and the flywheel and a spring urging the distal end of the hysteresis plate for pressing the lining onto the flywheel.

4 Claims, 2 Drawing Sheets

TORQUE VARIATION ABSORBING DEVICE

BACKGROUND OF THE INVENTION

1. Field of the Invention

The present invention relates to a torque absorbing device and, in particular, to a hysteresis mechanism of a torque absorbing device.

2. Description of the Related Art

U.S. Pat. No. 4,663,983 issued on May 12, 1987, discloses a conventional torque absorbing device in which a hysteresis mechanism is positioned between a driving plate and a flywheel. In the hysteresis mechanism, a lining of abrasive material is fixedly applied to a hysteresis plate to which a force is applied so as to press the plate against the flywheel. Thus, a desirable hysteresis is obtained due to the friction created by sliding, movement between the lining and the flywheel. Since the lining has to be of high durability or highly resistant to wear, polyamid resin has been used as the lining.

However, polyamid resin has poor adhesive properties and it is very difficult to connect the lining to the hysteresis plate. In order to obtain assured or reliable connection therebetween, additional processes are required including the use of a bonding agent having highly thermal resistance. The use of such a bonding agent is very expensive in the manufacture of the hysteresis mechanism.

SUMMARY OF THE INVENTION

It is, therefore, a principal object of the present invention to provide a torque variation absorbing device having a hysteresis mechanism which avoids the aforementioned drawbacks.

According to the present invention, a torque variation absorbing device includes a driving plate coupled to a driving shaft, a flywheel including a flywheel body and a driven plate and arranged coaxial with the driving plate to be rotatably supported thereon, a spring mechanism, a damping and torque limiting mechanism and a hysteresis mechanism interposed between the driving plate and the flywheel. The hysteresis mechanism includes a hysteresis plate which is fixed in the circumferential direction, a rubber member and a lining interposed between a distal end of the hysteresis plate and the flywheel and a spring urging the distal end of the hysteresis plate for pressing the lining onto the flywheel.

DETAILED DESCRIPTION OF THE PREFERRED EMBODIMENTS

Figure 1:
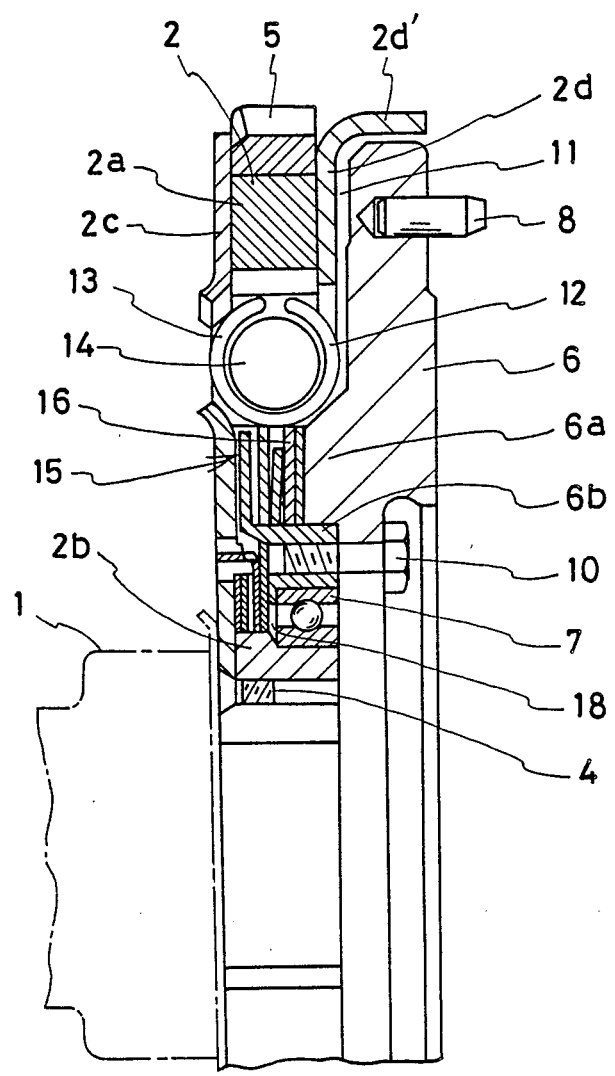
FIG. 1 is a partial cross-sectional view of a torque variation absorbing device according to the present invention.
Figure 2:
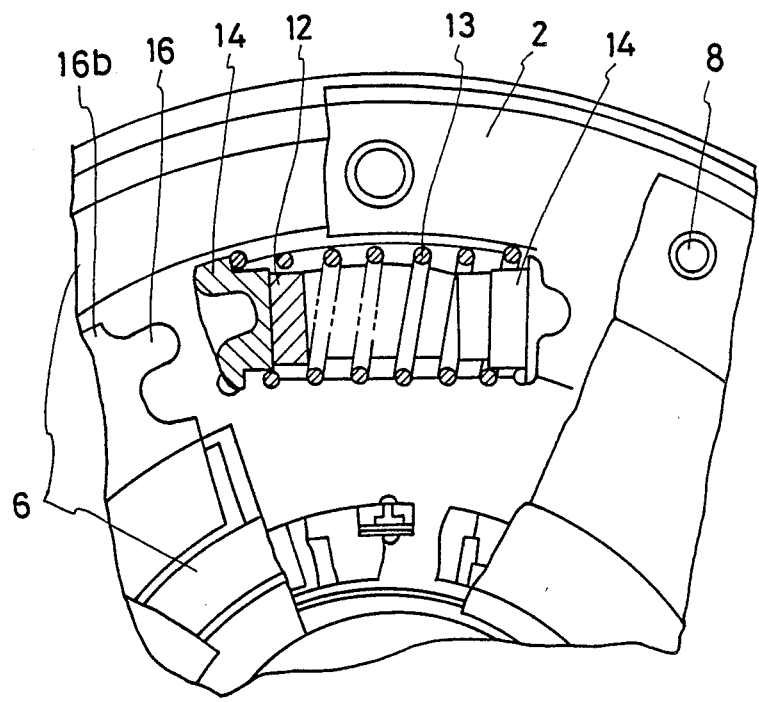
FIG. 2 is a partial plan view of a torque variation absorbing device according to the present invention.
Figure 3:
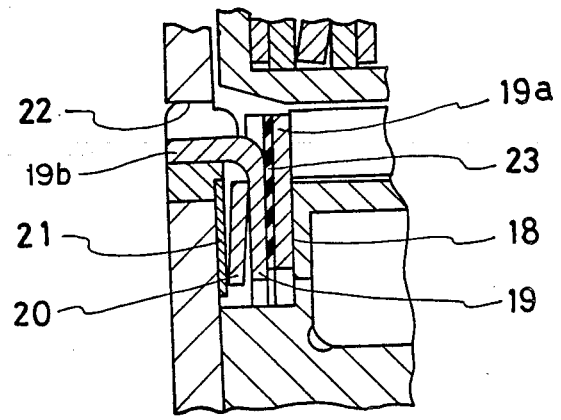
FIG. 3 is a cross-sectional view on an enlarged scale of a hysteresis mechanism in a torque variation absorbing device according to the present invention.

Referring now to FIGS. 1 through 3, a driving plate 2 is connected to an engine crank shaft 1 so as to be rotated therewith. The driving plate 2 includes an outer body 2a in the form of a ring, an inner body 2b in the form of a ring, and a pair of steel side plates 2c and 2d which clamp the bodies 2a and 2b from both sides by a rivet (not shown) and a screw 4 in a well known manner. On an outer periphery of the body 2a, a ring gear 5 is press-fitted or shrink-fitted thereto for accommodating the starting of an engine of a vehicle provided with the torque absorbing device.

The side plate 2d, as a part of the driving plate 2, is located close to the flywheel 6 and has an L-shaped bent portion 2d' for surrounding the flywheel 6. The bent portion 2d' covers a gap 11 extending straight in the radial direction between the driving plate 2 and the flywheel 6.

Parallel to the driving plate 2 and coaxial therewith, the flywheel 6 is rotatably installed on the driving plate 2 via a bearing 7 so as to be rotated relative to the driving plate 2. A clutch-positioning pin 8 is provided for positioning a clutch (not shown).

The flywheel 6 is divided into a flywheel body 6a and a driven plate 6b so that the body 6a may accommodate therein a damping and torque limiting mechanism 15. The flywheel body 6a and the driven plate 6b are connected together by means of a bolt 10. A spring mechanism 12 is provided as a vibration suppression mechanism and is positioned between the driving plate 2 and the flywheel 6. The spring mechanism 12 includes a plurality of coil springs 13 arranged in the circumferential direction and spring seats 14 provided at both ends of each spring 13. The spring seats 14 are deformable and have a greater spring constant than spring 13. The spring seats 14 are identical in shape. One of the seats 14, provided at both ends of each spring 13, is opposed to a radially inward projection of the outer body 2a of the driving plate 2 so as to contact the outer body 2a and the other of the spring seats 14 is opposed to a radially outward projection 16b of a driven disk 16 of the damping and torque limiting mechanism 15 so as to contact the driven disk 16.

The hysteresis mechanism 18 is positioned radially inwardly of the torque limiting mechanism 15 and between the driving plate 2 and the flywheel 6. As best shown in FIG. 3, the hysteresis mechanism 18 includes a hysteresis plate 19 with a bent portion 19b which is fitted into a hole or opening 22 provided in the side plate 2c of the driving plate 2, thereby circumferentially fixing the hysteresis plate 19 to the driving plate 2. A cone spring 20 is installed between the hysteresis plate 19 and the side plate 2c, thereby pressing the lining 19a against the flywheel 6. A ring member 21 is interposed between the spring 20 and the side plate 2c. Between the lining 19a and the plate 19, there is interposed a rubber sheet 23 for preventing relative rotation therebetween. Since the rubber sheet 23 has to be a material having thermal resistance and high adhesion qualities, a silicon-rubber having a frictional coefficient ranging from about 1.04 to about 1.10 or fluorine rubber with a frictional coefficient ranging from about 1.13 to about 1.26 is employed as a raw material from which the rubber sheet 23 is produced. By the use of the rubber sheet 23, the drawbacks of using a polyamid resin are overcome while still providing a torque variation absorbing device in which the desired hysteresis is obtained and the lining of the sheet 23 is of high durability and wear resistant.

The principles, preferred embodiments and modes of operation of the present invention have been described in the foregoing application. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing detailed description should be considered exemplary in nature and not limited to the scope and spirit of the invention as set forth in the appended claims.

What is claimed is:

1. A torque variation absorbing device comprising:
   a driving plate coupled to a driving shaft;
   a flywheel including a flywheel body and a driven plate, said flywheel being arranged coaxially with the driving plate and being rotatably supported thereon; and
   a spring mechanism, a damping and torque limiting mechanism and a hysteresis mechanism interposed between the driving plate and the flywheel, the hysteresis mechanism including a hysteresis plate, a rubber member and a lining interposed between a distal end of the hysteresis plate and the flywheel, said rubber member being secured to and positioned between said hysteresis plate and said lining, and a spring urging the distal end of the hysteresis plate in the direction of the lining to press the lining to the flywheel.

2. A torque variation absorbing device according to claim 1, wherein the rubber member is thermally resistant and highly adhesive.

3. A torque variation absorbing device according to claim 1, wherein the rubber member is silicon rubber having a frictional coefficient ranging from about 1.04 to about 1.10.

4. A torque variation absorbing device according to claim 1, wherein the rubber member is fluorine rubber having a frictional coefficient ranging from about 1.13 to about 1.25.

* * * * *